US007634283B2

(12) United States Patent
Luebke

(10) Patent No.: US 7,634,283 B2
(45) Date of Patent: Dec. 15, 2009

(54) WIRELESS COMMUNICATION NETWORK, SUB-SYSTEM THEREFOR AND METHOD OF CONFIGURING A NON-NATIVE NETWORK DEVICE EMPLOYING AN ADAPTER

(75) Inventor: Charles J. Luebke, Sussex, WI (US)

(73) Assignee: Eaton Corporation, Cleveland, OH (US)

( * ) Notice: Subject to any disclaimer, the term of this patent is extended or adjusted under 35 U.S.C. 154(b) by 640 days.

(21) Appl. No.: 11/530,649

(22) Filed: Sep. 11, 2006

(65) Prior Publication Data

US 2008/0064427 A1 Mar. 13, 2008

(51) Int. Cl.
*H04B 7/00* (2006.01)
*H04Q 7/00* (2006.01)

(52) U.S. Cl. ............... 455/500; 455/41.2; 455/507; 340/539.23

(58) Field of Classification Search ............ 455/426, 455/11.1, 557, 69, 70, 560, 561, 562.1, 575.1, 455/422.1, 500, 41.2, 566, 574, 343.1, 507, 455/88, 423; 340/539.26, 3.1, 506, 686.1, 340/539.23, 539.21, 426.13, 309.16, 573.4; 700/19, 20, 66, 65
See application file for complete search history.

(56) References Cited

U.S. PATENT DOCUMENTS

| 5,907,279 | A | 5/1999 | Bruins et al. |
| 5,987,011 | A | 11/1999 | Toh |
| 6,034,961 | A | 3/2000 | Masuo et al. |
| 6,167,025 | A | 12/2000 | Hsing et al. |
| 6,924,735 | B2 * | 8/2005 | Ueda et al. ............. 340/426.28 |
| 7,110,836 | B2 * | 9/2006 | Sturm et al. ............. 700/83 |
| 2005/0057359 | A1 * | 3/2005 | Coffey et al. ........... 340/539.21 |
| 2005/0085180 | A1 * | 4/2005 | Ballay et al. ................ 455/1 |
| 2005/0085248 | A1 | 4/2005 | Ballay et al. |
| 2006/0049922 | A1 * | 3/2006 | Kolpasky et al. ....... 340/426.13 |
| 2006/0197660 | A1 | 9/2006 | Luebke et al. |
| 2007/0198675 | A1 * | 8/2007 | Amanuddin et al. ......... 709/223 |
| 2009/0033485 | A1 * | 2/2009 | Naeve et al. ........... 340/539.23 |
| 2009/0092112 | A1 * | 4/2009 | Kim et al. .................... 370/338 |

OTHER PUBLICATIONS

Johnson, David B., et al., "Dynamic Source Routing in Ad Hoc Wireless Networks", Mobile Computing, 1996, 18 pp.
SearchSecurity.com, "key fob," http://searchsecurity.techtarget.com/sDefinition/0,,sid14_gci795968,00.html, Sep. 22, 2003, 2 pp.

(Continued)

*Primary Examiner*—Sujatha Sharma
(74) *Attorney, Agent, or Firm*—Martin J. Moran

(57) ABSTRACT

A sub-system for a wireless communication network includes a fob and an adapter. The fob includes a portable housing, a first wireless port structured to wirelessly communicate with a server, a second port structured to communicate with a native network device when the second port engages or is proximate to the native network device, and a processor operatively associated with the first wireless port and the second port. The processor is structured to receive engagement or proximity information from the second port, and send information to the server from the first wireless port. The sent information pertains to the native network device or to a non-native network device. An adapter includes a housing having a target. When the second port is properly positioned with respect to the target, the fob responsively participates in a joining procedure of the non-native network device to the server.

36 Claims, 7 Drawing Sheets

OTHER PUBLICATIONS

GE Industrial Systems, "Electronic House Magazine Names Smart ConnectionCenter and NetworX NX-8E Product of the Year", Aug. 12, 2003, 2 pp.

GE Industrial Systems, "GE Interlogix Releases The Concord Ultra Security System", Sep. 2, 2003, 2 pp.

* cited by examiner

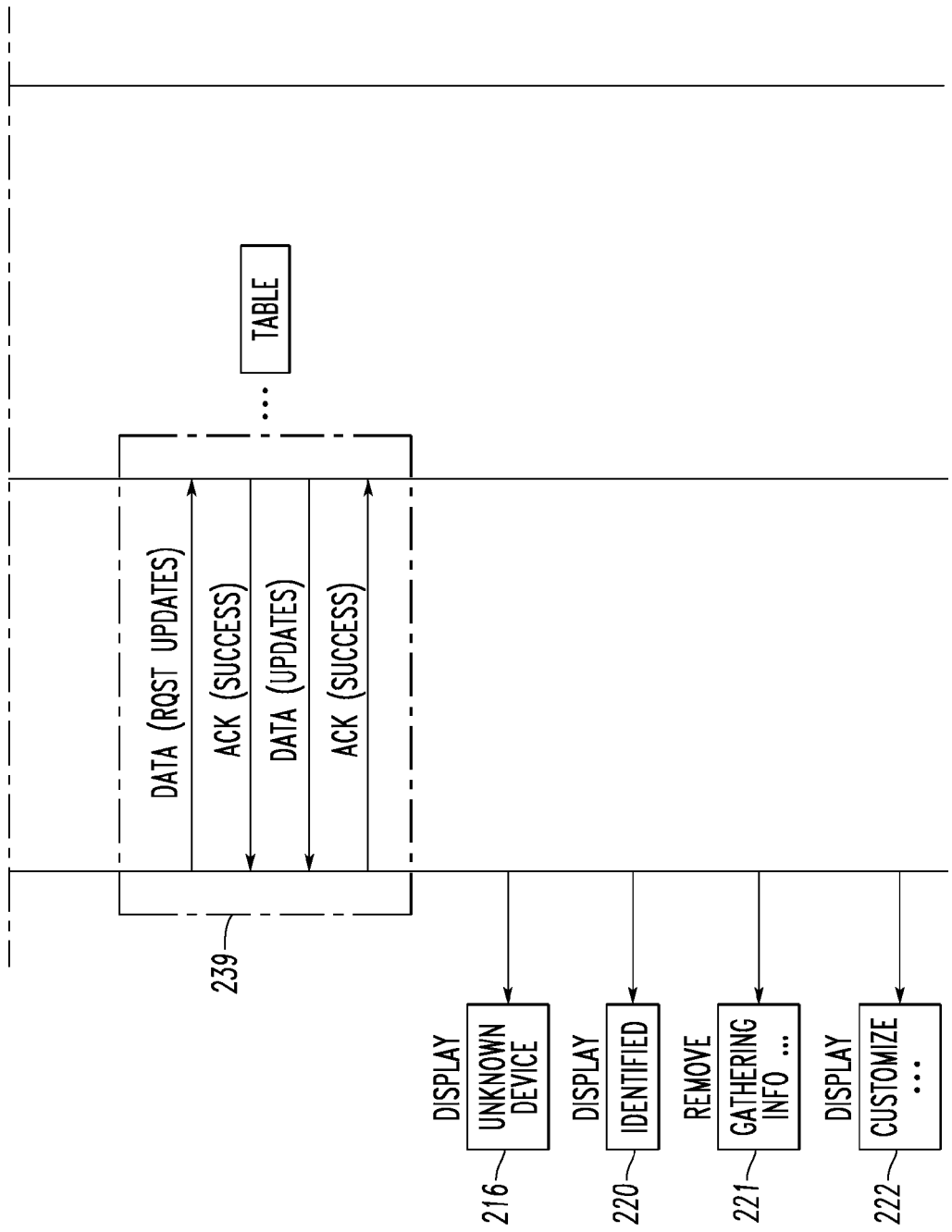

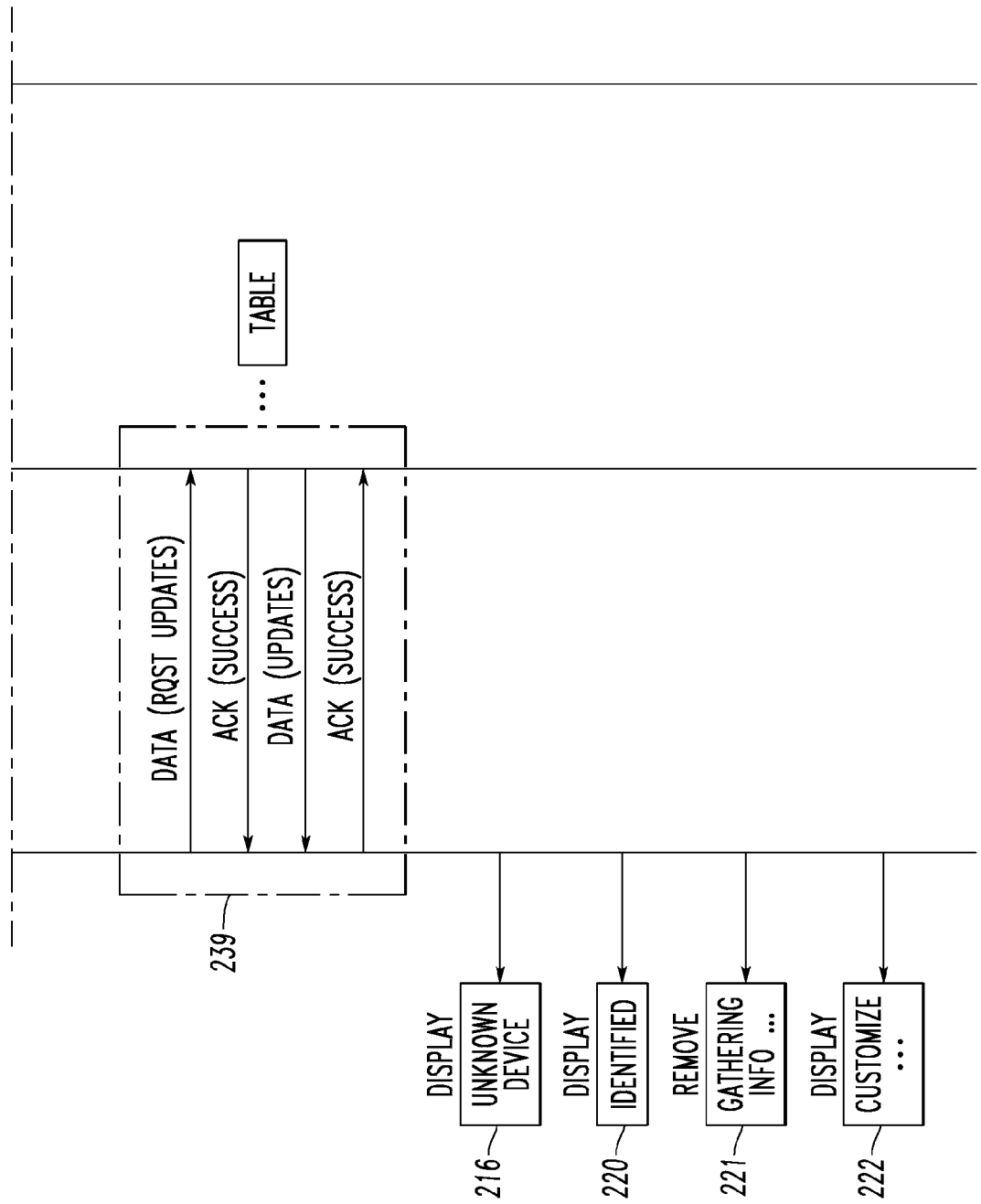

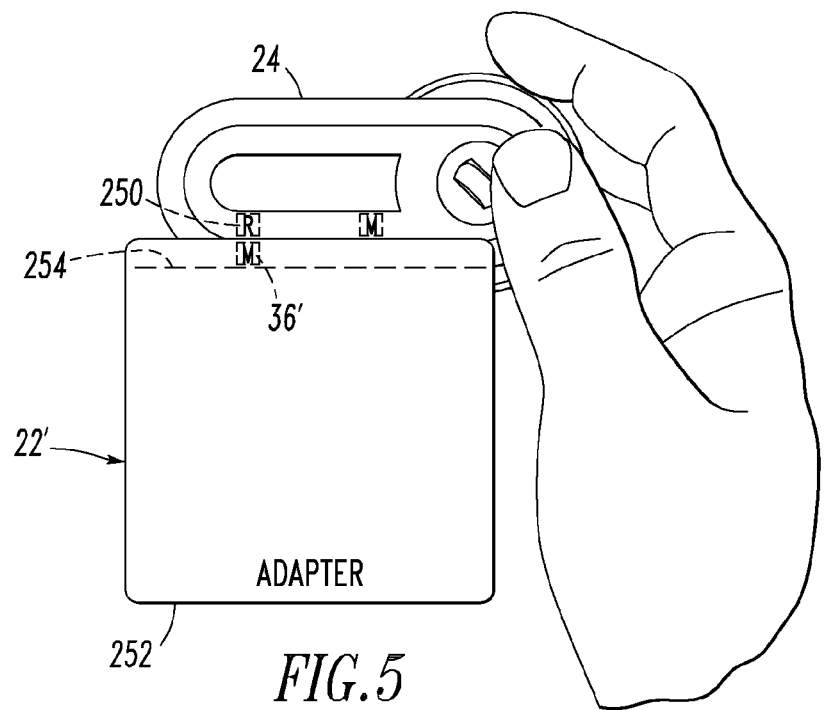
FIG. 5
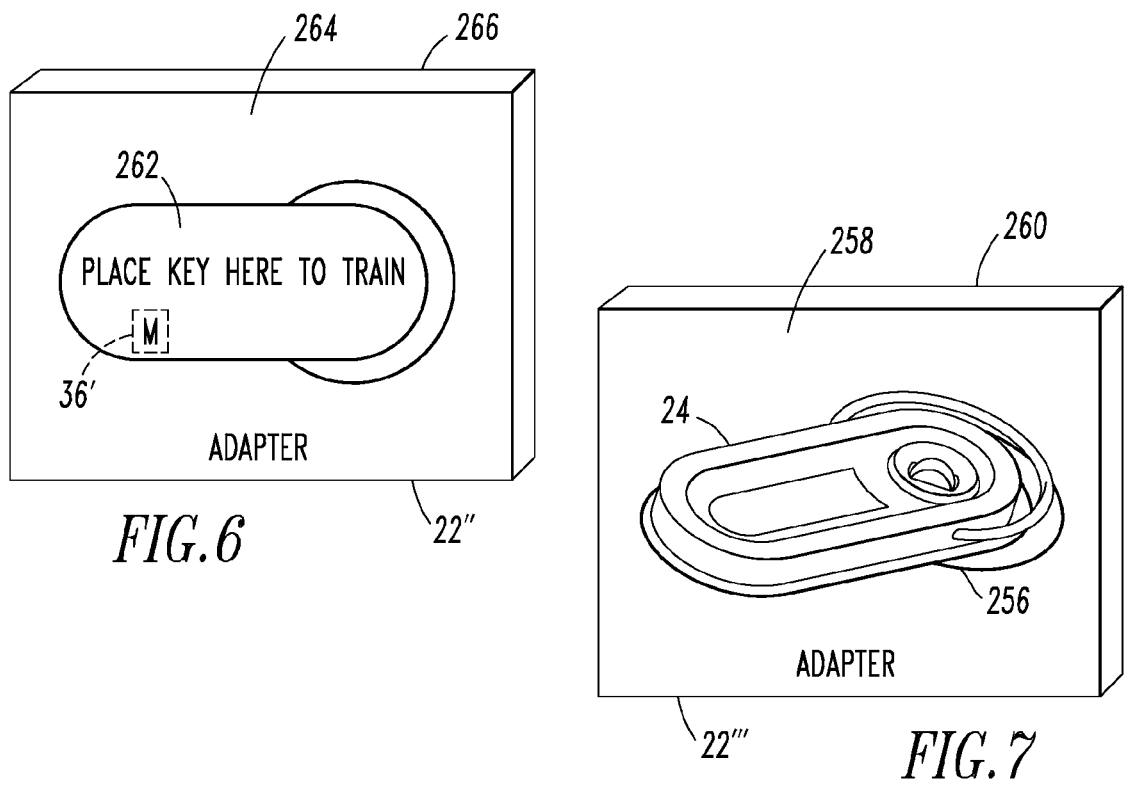
FIG. 6
FIG. 7

US 7,634,283 B2

WIRELESS COMMUNICATION NETWORK, SUB-SYSTEM THEREFOR AND METHOD OF CONFIGURING A NON-NATIVE NETWORK DEVICE EMPLOYING AN ADAPTER

CROSS-REFERENCE TO RELATED APPLICATIONS

This application is related to commonly assigned:

U.S. patent application Ser. No. 10/686,016, filed Oct. 15, 2003, entitled "Home System Including A Portable Fob Mating With System Components"; and U.S. patent application Ser. No. 11/063,120, filed Feb. 22, 2005, entitled "Home System, Method And Wireless Node Employing Non-Physical Configuration Of Embedded Device Or Sensor Of A Household Object".

BACKGROUND OF THE INVENTION

1. Field of the Invention

This invention pertains generally to communication networks and, more particularly, to wireless communication networks for configuring non-native network devices. The invention also pertains to sub-systems of wireless communication networks for joining non-native network devices. The invention further relates to methods of configuring non-native network devices of a wireless communication network.

2. Background Information

U.S. Patent Application Publication No. 2005/0085248 discloses a method of authenticating and joining a sensor or other wireless node to a wireless communication system by mating a portable fob with the sensor, thereby activating a proximity sensor in both the fob and the sensor. The portable fob is engaged with or placed proximate the sensor. Wireless messages are communicated from the sensor and the portable fob to a server in order to configure the sensor as part of the wireless communication system. The portable fob displays a confirmation at the portable fob that the sensor was configured.

Application Ser. No. 11/063,120 discloses a mechanism that allows a proximity sensor (e.g., without limitation, magnet and reed switch) to be embedded (or hidden), albeit close to the surface of a device or sensor (e.g., lock for a door; pet water bowl), with a label thereon to indicate where to locate the portable fob in suitable close proximity to the proximity sensor to initiate the joining procedure to a wireless communication system.

Simply broadcasting a "request to join" message from the server and requesting a confirmation at the portable fob has the disadvantage that if more than one third party device or sensor is present, which cannot mate with the fob, then all third party devices or sensors will recognize and respond to the join request. As a result, there is not a known way to distinguish and authenticate the correct third party device or sensor.

A third party device or sensor may have a button or other input device by which a user can trigger/activate it to initiate a joining procedure, but in order to prevent any such device or sensor from just joining a wireless communication network "automatically," a procedure or mechanism of authorization/authentication also needs to be provided for confirming/permitting the join request.

Third party devices and sensors that do not have a proximity sensor or a label thereon to indicate where to locate the portable fob in suitable close proximity to the label to initiate the joining procedure to a wireless communication network need a mechanism of triggering the joining procedure with the portable fob.

Accordingly, there is room for improvement in wireless communication networks and in sub-systems of such wireless communication networks for joining non-native network devices.

There is also room for improvement in methods of configuring non-native network devices of such a wireless communication network.

SUMMARY OF THE INVENTION

These needs and others are met by embodiments of the invention, which permit a non-native network device, such as for example, a third party device or sensor or other node, to join a wireless communication network even when that third party device or sensor cannot be sensed by a portable fob. Here, another set of nodes (e.g., without limitation, devices; sensors), particularly those coming from third party vendors, employ suitable wireless messages, but do not have a target embedded therein. Instead, a suitable adapter contains a target (e.g., without limitation, a magnet) in order that there is a mechanism to join the third party device or sensor with the wireless communication network.

In accordance with one aspect of the invention, a wireless communication network comprises: a server including a wireless port; a number of native network devices, each of the native network devices comprising a first wireless port structured to wirelessly communicate with the wireless port of the server and a second port; a non-native network device comprising a wireless port structured to wirelessly communicate with the wireless port of the server; an adapter; and a portable fob comprising: a portable housing, a first wireless port structured to wirelessly communicate with the wireless port of the server, a second port structured to communicate with the second port of one of the native network devices when the second port of the portable fob engages or is proximate to the second port of one of the native network devices, and a processor operatively associated with the first wireless port and the second port of the portable fob, the processor being structured to receive engagement or proximity information from the second port of the portable fob, and to send information to the wireless port of the server from the first wireless port of the portable fob, the sent information pertaining to one of the native network devices or the non-native network device, wherein the adapter is structured to engage or be proximate to the second port of the portable fob when connecting the non-native network device to the wireless communication network, wherein the second port of the portable fob is structured to sense the adapter when the second port of the portable fob engages or is proximate to the adapter, and wherein the second port of the portable fob is not structured to sense the non-native network device.

The non-native network device may be structured to initiate a joining procedure with the wireless communication network before the adapter engages or is proximate to the second port of the portable fob.

The non-native network device may be structured to initiate a joining procedure with the wireless communication network after the adapter engages or is proximate to the second port of the portable fob.

As another aspect of the invention, a sub-system is for a wireless communication network including a server, a number of native network devices, and a number of non-native network devices. The sub-system comprises: a portable fob comprising: a portable housing, a first wireless port structured to wirelessly communicate with the server, a second port structured to communicate with one of the native network devices when the second port of the portable fob engages or is proximate to the one of the native network devices, and a processor operatively associated with the first wireless port and the second port of the portable fob, the processor being structured to receive engagement or proximity information from the second port of the portable fob, and to send information to the server from the first wireless port of the portable fob, the sent information pertaining to one of the native network devices or the non-native network device; and an adapter comprising a housing including a target, wherein when the second port of the portable fob is properly positioned with respect to the target, the portable fob responsively participates in a joining procedure of one of the non-native network devices to the server.

As another aspect of the invention, a method of configuring a non-native network device of a wireless communication network including a server comprises: employing a portable fob; engaging the portable fob with or placing the portable fob proximate an adapter; responsive to the engaging the fob with or placing the fob proximate an adapter, communicating a wireless message from the fob to the server in order to configure the non-native network device; communicating a wireless message from the non-native network device to the server in order to configure the non-native network device; and receiving a confirmation from the server and responsively displaying the confirmation at the portable fob that the non-native network device was configured as part of the wireless communication network.

BRIEF DESCRIPTION OF THE DRAWINGS

A full understanding of the invention can be gained from the following description of the preferred embodiments when read in conjunction with the accompanying drawings in which:

FIGS. 2A-2B and 3A-3B are message flow diagrams showing the interaction between the fob, a non-native network device and the base station of FIG. 1 for configuring the non-native network device in accordance with embodiments of the invention.

FIG. 5 is a simplified vertical elevation view of an adapter being engaged by the fob of FIG. 1 in accordance with another embodiment of the invention.

FIG. 6 is a simplified isometric view of an adapter for engagement by the fob of FIG. 1 in accordance with another embodiment of the invention.

FIG. 7 is a simplified isometric view of an adapter being engaged by the fob of FIG. 1 in accordance with another embodiment of the invention.

DESCRIPTION OF THE PREFERRED EMBODIMENTS

Figure 1:
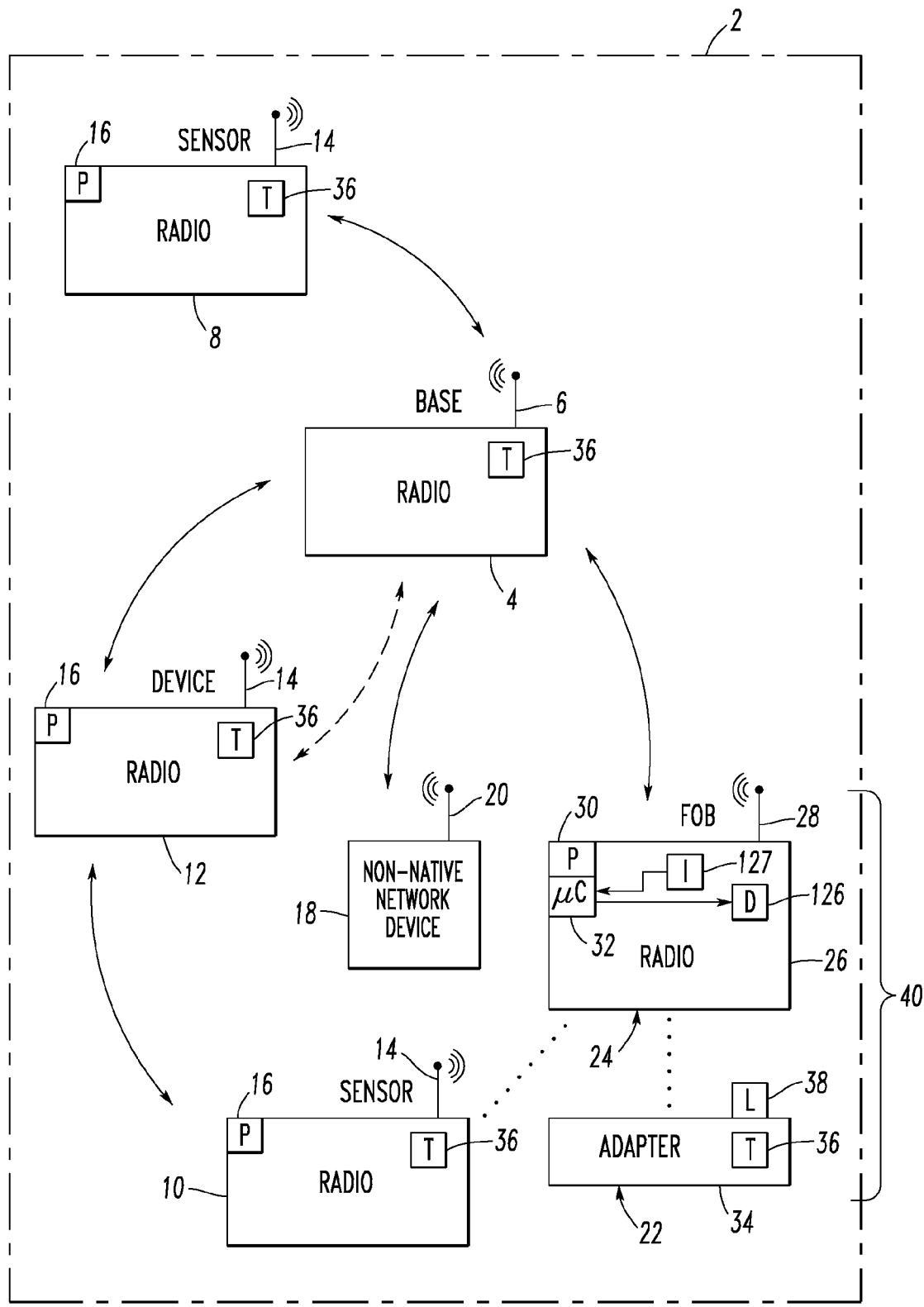
FIG. 1 is a block diagram of a wireless communication network in accordance with an embodiment of the invention.

As employed herein, the term "number" shall mean one or an integer greater than one (i.e., a plurality).

As employed herein, the term "wireless" shall expressly include, but not be limited by, radio frequency (RF), infrared, IrDA, wireless area networks, IEEE 802.11 (e.g., 802.11a; 802.11b; 802.11g), IEEE 802.15 (e.g., 802.15.1; 802.15.3, 802.15.4), other wireless communication standards (e.g., without limitation, ZigBee™ Alliance standard), DECT, PWT, pager, PCS, Wi-Fi, Bluetooth™, and cellular.

As employed herein, the term "communication network" shall expressly include, but not be limited by, any local area network (LAN), wide area network (WAN), intranet, extranet, global communication network, the Internet, and/or wireless communication system.

As employed herein, the term "portable wireless communicating device" shall expressly include, but not be limited by, any portable communicating device having a wireless communication port (e.g., without limitation, a portable wireless device; a portable personal computer (PC); a Personal Digital Assistant (PDA); a data phone).

As employed herein, the term "fob" shall expressly include, but not be limited by, a portable wireless communicating device; handheld portable communicating device having a wireless communication port (e.g., without limitation, a handheld wireless device; a handheld personal computer (PC); a Personal Digital Assistant (PDA); a wireless network device; a wireless object that is directly or indirectly carried by a person; a wireless object that is worn by a person; a wireless object that is placed on or coupled to a household object (e.g., a refrigerator; a table); a wireless object that is coupled to or carried by a personal object (e.g., a purse; a wallet; a credit card case); a portable wireless object; and/or a handheld wireless object.

As employed herein, the term "network coordinator" (NC) shall expressly include, but not be limited by, any communicating device, which operates as the coordinator for devices wanting to join a wireless communication network and/or as a central controller in a wireless communication network.

As employed herein, the term "network device" (ND) shall expressly include, but not be limited by, any communicating device (e.g., without limitation, a portable wireless communicating device; a fob; a camera/sensor device; a wireless camera; a control device; and/or a fixed wireless communicating device, such as, for example, switch sensors, motion sensors or temperature sensors as employed in a wirelessly enabled sensor network), which participates in a wireless communication network, and which is not a network coordinator.

As employed herein, the term "native network device" means a network device that is native to or normally part of a wireless communication network.

As employed herein, the term "non-native network device" means a network device that is not native to and is not normally part of, but may still be joined to, a wireless communication network including a number of native network devices. The "non-native network device" cannot be sensed by a fob that is structured to sense native network devices of the wireless communication network.

As employed herein, the term "node" includes NDs and NCs.

As employed herein, the term "headless" means without any user input device and without any display device.

As employed herein, the term "server" shall expressly include, but not be limited by, a "headless" base station; and/or a network coordinator.

As employed herein, the term "system" shall expressly include, but not be limited by, a system for a home or other type of residence or other type of structure, or a system for a land vehicle, a marine vehicle, an air vehicle or another motor vehicle.

As employed herein, the term "system for a structure" shall expressly include, but not be limited by, a system for a home or other type of residence or other type of structure.

As employed herein, the term "system for a vehicle" shall expressly include, but not be limited by, a system for a land vehicle, a marine vehicle, an air vehicle or another motor vehicle.

As employed herein, the term "residence" shall expressly include, but not be limited by, a home, apartment, dwelling, office and/or place where a person or persons reside(s) and/or work(s).

As employed herein, the term "structure" shall expressly include, but not be limited by, a home, apartment, dwelling, garage, office building, commercial building, industrial building, a roofed and/or walled structure built for permanent or temporary use, a structure for a land vehicle, a structure for a marine vehicle, a structure for an air vehicle, or a structure for another motor vehicle.

As employed herein, the term "land vehicle" shall expressly include, but not be limited by, any land-based vehicles having pneumatic tires, any rail-based vehicles, any maglev vehicles, automobiles, cars, trucks, station wagons, sport-utility vehicles (SUVs), recreational vehicles, all-terrain vehicles, vans, buses, motorcycles, mopeds, campers, trailers, or bicycles.

As employed herein, the term "marine vehicle" shall expressly include, but not be limited by, any water-based vehicles, ships, boats, other vessels for travel on water, submarines, or other vessels for travel under water.

As employed herein, the term "air vehicle" shall expressly include, but not be limited by, any air-based vehicles, airplanes, jets, aircraft, airships, balloons, blimps, or dirigibles.

As employed herein, the terms "home wellness system" or "wellness system" or "awareness system" shall expressly include, but not be limited by, a system for monitoring and/or configuring and/or controlling aspects of a home or other type of residence or other type of structure.

As employed herein, the term "user input device" shall expressly include, but not be limited by, any suitable transducer (e.g., without limitation, a rotary encoder; a joystick; a micro-joystick; a touchpad, which emulates a rotary encoder; a VersaPad OEM input pad marketed by Interlink Electronics, Inc. of Camarillo, Calif.), which collects user input through direct physical manipulation, with or without employing any moving part(s), and which converts such input, either directly or indirectly through an associated processor and/or converter, into a corresponding digital form.

As employed herein, the term "processor" shall expressly include, but not be limited by, any processing component with or without input(s) (e.g., without limitation, a user input device; an analog or digital input) and/or output(s) (e.g., without limitation, a display).

As employed herein, the statement that two or more parts are "connected" or "coupled" together shall mean that the parts are joined together either directly or joined through one or more intermediate parts. Further, as employed herein, the statement that two or more parts are "attached" shall mean that the parts are joined together directly.

As employed herein, the term "adapter" refers to any structure that cooperates with a fob to join a non-native network device to a wireless communication network. The adapter is preferably independent from the non-native network device, but, alternatively, may be associated with, attached to or coupled to the non-native network device.

As employed herein, the term "third party" means the same as the term "non-native". For example, the term "third party network device" means the same as the term "non-native network device".

As employed herein, the terms "train" or "training" or variations thereof refers to the process of adding a network device to a wireless communication network.

The present invention is described in association with a wireless home wellness or awareness system, although the invention is applicable to a wide range of wireless communication networks, including wireless nodes, for monitoring and/or configuring and/or controlling aspects of a structure.

U.S. Patent Application Publication No. 2005/0085248 is incorporated by reference herein.

Referring to FIG. 1, a wireless communication network 2 includes a server, such as base station 4, having a wireless port 6, and a number of native network devices 8,10,12. Each of the native network devices 8,10,12 includes a first wireless port 14 structured to wirelessly communicate with the wireless port 6 of the base station 4 and a second port (P) 16. A non-native network device 18 includes a wireless port 20 structured to wirelessly communicate with the wireless port 6 of the base station 4. The network 2 also includes an adapter 22 and a portable fob 24 having a portable housing 26, a first wireless port 28 structured to wirelessly communicate with the wireless port 6 of the base station 4, a second port (P) 30 structured to communicate with the second port 16 of one of the native network devices 8,10,12 when the second port 30 of the portable fob 24 engages or is proximate to the second port 16 of one of the native network devices 8,10,12. For example, the second port 30 of the fob 24 is structured to temporarily or momentarily mate with the second port 16 of one of the native network devices 8,10,12.

The portable fob 24 also includes a processor, such as μC 32, operatively associated with the first wireless port 28 and the second port 30 of the fob 24. The μC 32 is structured to receive engagement or proximity information from the second port 30 of the fob 24, and to send information to the wireless port 6 of the base station 4 from the first wireless port 28 of the fob 24. This sent information pertains to one of the native network devices 8,10,12 or the non-native network device 18, as will be discussed. The adapter 22 is structured to engage or be proximate to the second port 30 of the fob 24 when connecting the non-native network device 18 to the wireless communication network 2. The second port 30 of the fob 24 is structured to sense the adapter 22 when the second port 30 of the fob 24 engages or is proximate to the adapter 22. The second port 30 of the fob 24 is not structured to sense the non-native network device 18.

Two different embodiments are disclosed such that it is possible for the user to initiate a joining procedure for the non-native network device 18 by either: (1) first initiating a joining procedure with the non-native network device 18 (FIG. 2A); or (2) first coupling the fob 24 with the adapter 22 (FIG. 3A). Both embodiments allow the user to join a third party network device to the network 2. The sequence is slightly different, but the end result is the same.

EXAMPLE 1

The non-native network device 18 is a third party sensor or a third party device. As such, it does not include the second port 16 like the native network devices 8,10,12 (e.g., without limitation, sensors; devices) and is not structured to mate with the fob 24.

EXAMPLE 2

In this example, as will be discussed, the adapter 22, such as an example jig, fixture or template, is a "dummy" structure including a housing 34, a target (T) 36 and a label (L) 38 in order that the fob 24 in general, and the fob second port 30 in particular, may be properly positioned with respect to the adapter 22. The fob 24 and the adapter 22 form a sub-system 40 of the network 2. When the second port 30 of the fob 24 is properly positioned with respect to the adapter target 36, the fob 24 responsively participates in a joining procedure of a non-native network device, such as 18, to the base station 4. When configuring a non-native network device, such as 18, as part of the network 2, a user engages the fob 24 with or places the fob 24 proximate the adapter 22, which is preferably independent from the non-native network device 18. Wireless messages are communicated from both of the non-native network device 18 and the fob 24 to the base station 4 in order to configure the non-native network device 18. Then, a confirmation is received from the base station 4 and is responsively displayed at the fob 24 to confirm that the non-native network device 18 was configured as part of the network 2.

EXAMPLE 3

In this example, the target 36 is a magnet embedded in or substantially within the housing 34 of the adapter 22. The second port 30 of the fob 24 includes a proximity sensor, such as a reed switch, responsive to the magnet. When the fob 24 is brought in suitable close proximity and aligned to the adapter 22, the magnet therein causes the fob 24 to responsively participate in the joining procedure. The label 38 is preferably employed to properly position the fob 24 in order that the magnet will trigger the reed switch in the fob 24 to start the authentication and joining procedure. The advantage to triggering the fob's reed switch is to ensure that a new third party device or third party sensor is not inadvertently joined to the network 2 through a simple "confirm" button/thumbwheel press on the fob 24.

EXAMPLE 4

Figure 2A:
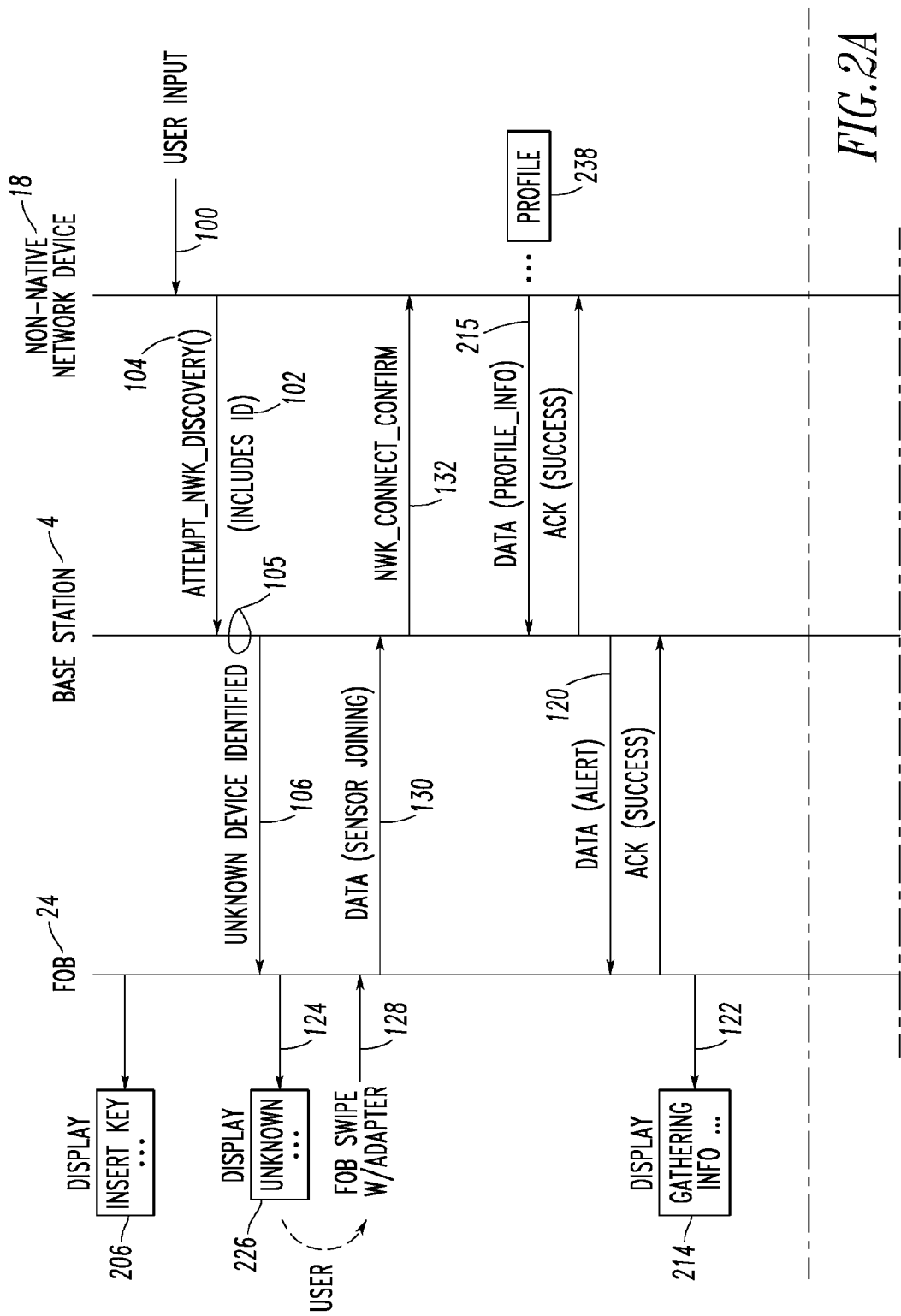
Figure 3A:
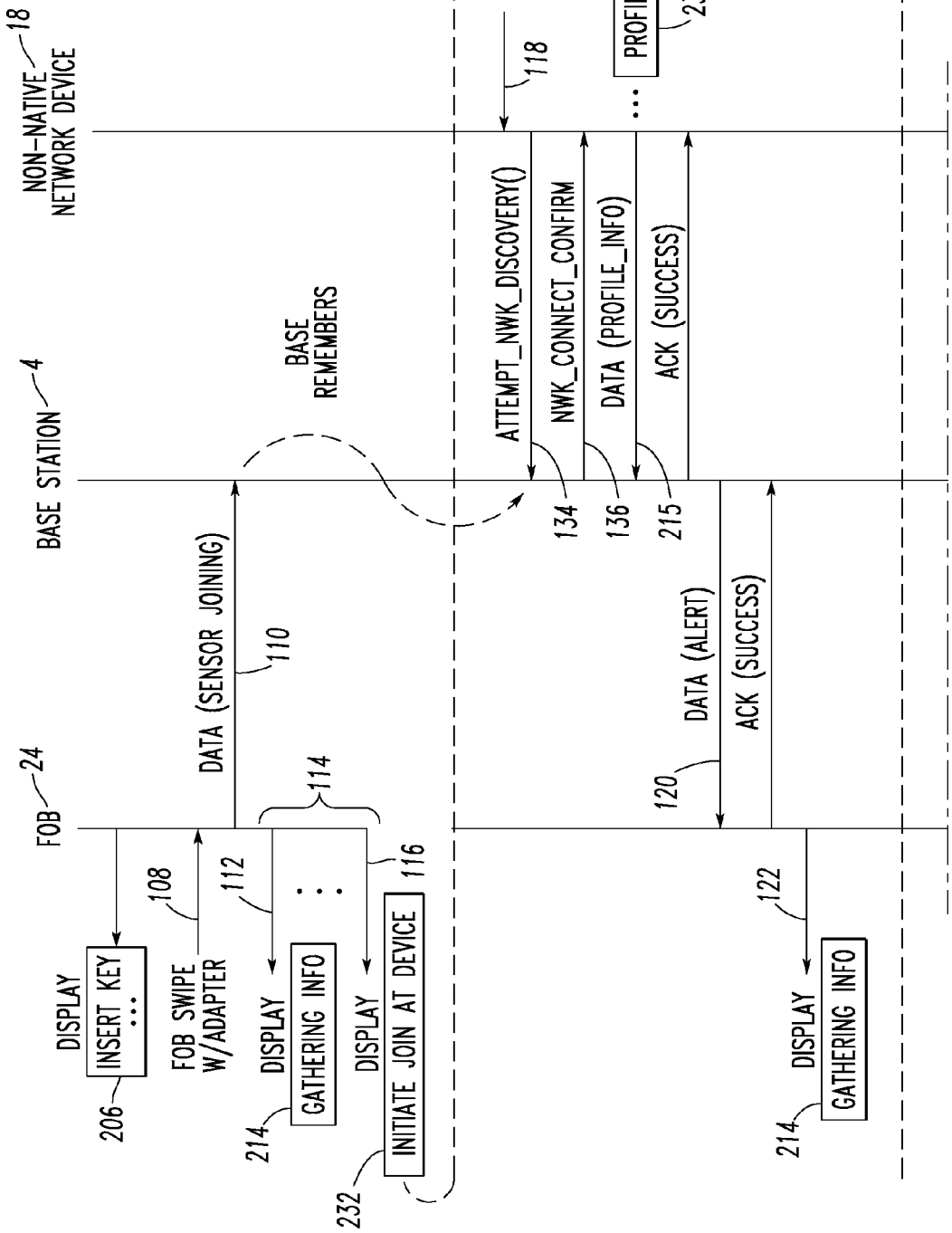

As shown in FIG. 2A, the non-native network device 18 may be structured to initiate a joining procedure with the network 2 of FIG. 1 before the adapter 22 (FIG. 1) engages or is proximate to the second port 30 of the fob 24. Here, the user follows the "join" instructions from the user manual (not shown) of the non-native network device 18. This could involve, for example, user input 100 (e.g., without limitation, a button press on a third party device or third party sensor; a power reset; any suitable mechanism to initiate an identifier (ID) 102 being transmitted by the non-native network device 18 to the base station 4). In response to the user input 100, the non-native network device 18 sends a wireless message, such as the attempt_nwk_discovery( ) RF message 104, to the base station 4. The base station 4 receives the RF message 104 including the ID 102 and delays or waits at 105 for a suitable time (e.g., without limitation, 100 ms) for a data (sensor joining) RF message 130 from the fob 24. The base station 4 informs the fob 24 of the RF message 104 through RF message 106 (e.g., without limitation, "Unknown sensor found. Ok to join?"; "unknown device identified, mate key fob with the adapter to join").

However, instead of the user confirming with a user input device (I), 127 (FIG. 1) of the fob 24, the user advantageously employs the adapter 22 (FIG. 1) to accept the unknown non-native network device 18, and then proceeds to the typical user interface display screens (FIG. 4), for example, for selecting the third party sensor or third party device name. In this manner, an accidental trigger of the fob second port 30 (e.g., without limitation, a proximity sensor, such as a reed switch) (FIG. 1) can effectively be canceled or "ignored".

EXAMPLE 5

Figures 4, 8:
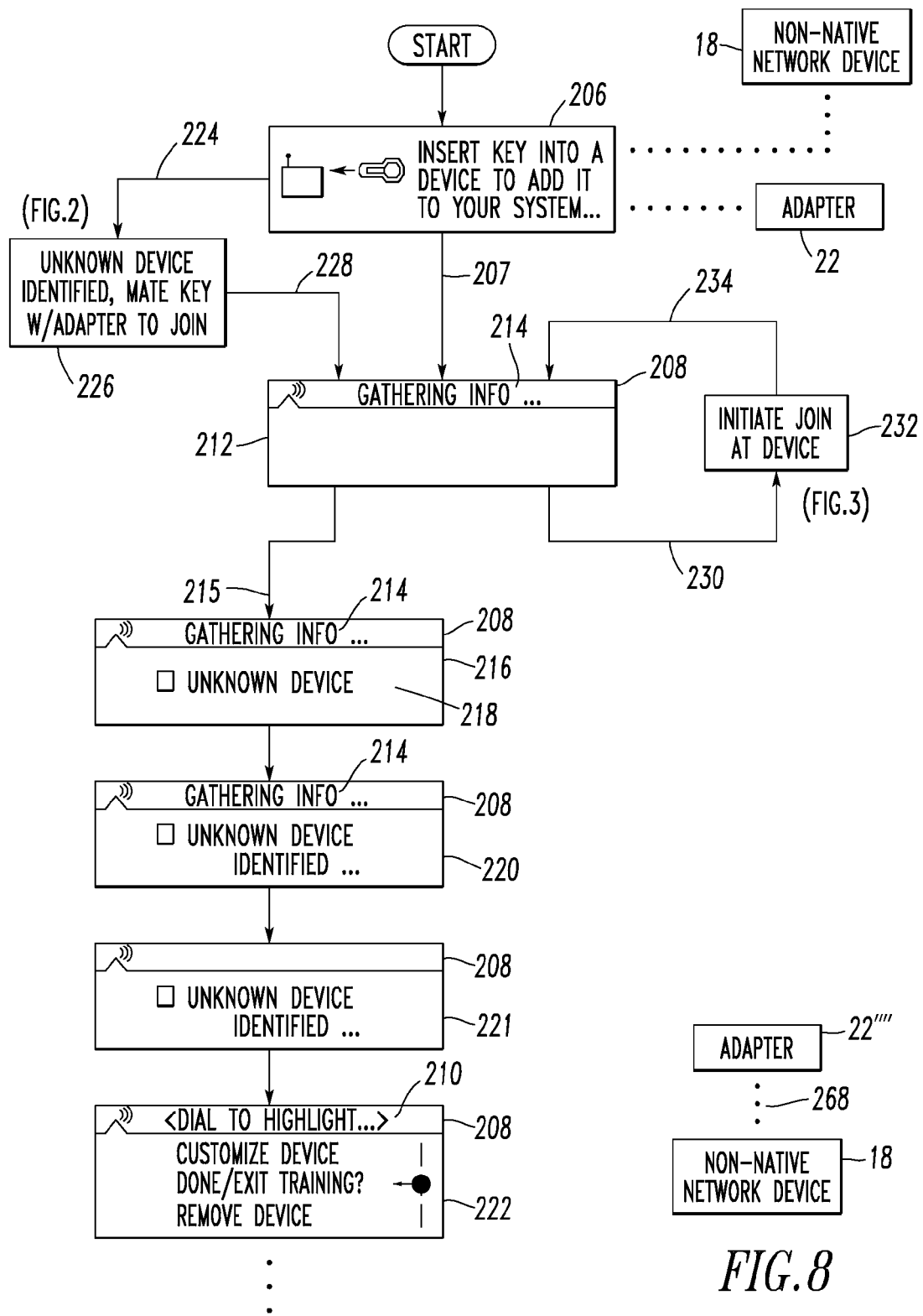
FIG. 4 is an example of a display sequence used by the fob for configuring the non-native network device of FIG. 1.
FIG. 8 is a block diagram of a non-native network device including an adapter structured to be coupled thereto in accordance with another embodiment of the invention.

As shown in FIG. 3A, the non-native network device 18 of FIG. 1 may be structured to initiate a joining procedure with the network 2 (FIG. 1) after the adapter 22 (FIG. 1) engages or is proximate to the second port 30 of the fob 24 (or, equivalently, the second port 30 of the fob 24 engages or is proximate to the adapter 22, such as the target 36 thereof). At 108, the user suitably mates the fob 24 with the adapter 22 to initiate the joining procedure. The second port 30 of the fob 24 includes a proximity sensor structured to sense the target 36 of the adapter 22. When the target 36 is sensed, the fob 24 responsively sends a DATA (Sensor Joining) RF message 110 to the base station 4 to initiate joining the non-native network device 18 to the network 2. The fob 24 also displays a message 112 (e.g., without limitation, "gathering info" 214 (FIG. 4); "prepare to join the sensor or device, please wait") while it expects to receive a "data (alert)" RF message 120 from the base station 4 to indicate that a new device is joining.

However, since there will not be a corresponding join request message (not shown) from the adapter 22 or from the non-native network device 18 to the base station 4, the base station 4 will not send the "network connect confirm" message 134, and the fob 24 will time out at 114 (e.g., without limitation, after a few seconds; after five seconds) and return, at 116, to a previous known state (e.g. without limitation, screen 206 or screen 232 of FIG. 4). This prompts the user to undertake the desired user input at the non-native network device 18.

The base station 4, however, will advantageously remember the "join request" message 110 from the fob 24 for a suitably longer time period, thereby allowing the user to initiate the join procedure for the non-native network device 18 through user input 118, as will be discussed. The base station 4 recognizes this "delayed" pairing, and ultimately informs the fob 24 through message 120 to display a message 122 (e.g., without limitation, "unknown device joined"; "unknown sensor found"). The fob 24 then proceeds to the typical user interface display screens (FIG. 4), for example, for selecting the third party sensor or device name.

EXAMPLE 6

Referring again to FIG. 2A, in response the RF message 106, the fob 24 displays a message 124 on its display (D) 126 (FIG. 1), which message preferably instructs the user to engage the fob 24 with the adapter 22 (FIG. 1). After the user responsively engages the fob 24 with or places the fob 24 proximate the adapter 22, at 128, the second port 30 (FIG. 1) of the fob 24 senses the adapter 22 and the fob 24 responsively sends a DATA (Sensor Joining) RF message 130 to the base station 4.

After receiving the two RF messages 104,130, the base station 4 responsively sends a nwk_connect_confirm( ) RF message 132 back to the non-native network device 18, in order to confirm connection of the non-native network device 18 to the network 2.

EXAMPLE 7

Referring again to FIG. 3A, in response to receiving the user input 118, the non-native network device 18 sends an RF message, such as the attempt_nwk_discovery( ) RF message 134, to the base station 4. After receiving the two RF messages 110,134, the base station 4 responsively sends a nwk_connect_confirm( ) RF message 136 back to the non-native network device 18, in order to confirm joining the non-native network device 18 to the network 2. Also, as was discussed above, the base station 4 sends the RF data (alert) message 120 to the fob 24.

EXAMPLE 8

The fob μC 32 includes the user input device 127 and is structured to receive user input from the user input device 127 and responsively select the name of the non-native network device 18 from the user input device responsive to receiving the RF message 122 of FIG. 2A or 3A.

EXAMPLE 9

In FIGS. 2A and 3A, after either of the nwk_connect_confirm RF messages 132 or 136, the non-native network device 18 provides information from the profile 238 to the base station 4, as is discussed in detail in connection with FIG. 9B of incorporated by reference U.S. Patent Application Publication No. 2005/0085248. At screen 206 of FIG. 4, a user is instructed to insert the fob 24 into a device, such as a native network device (e.g., a non-configured native sensor 8,10 or native network device 12 of FIG. 1) in order to add it to the network 2 of FIG. 1. In summary, when one of the native network devices 8,10,12 is keyed in this manner, the fob 24 begins gathering corresponding information and, then, reports the success to the user. The fob 24 provides the ability to customize the native network devices 8,10,12, with the status bar 208 cycling through two messages "<dial to highlight . . . >" 210 and "press to select>" (not shown). Following the screen 206, if the fob 24 was swiped with a native network device, at 207, then the screen 212 reports the message "<gathering info . . . >" 214.

After the nwk_connect_confirm RF message 132 (FIG. 2A) was sent to and acknowledged by a native network device or by the non-native network device 18 by sending information from its profile 238 at 215, the screen 216 reports the type of sensor or device (e.g., an Open-Close Sensor; an unknown device 218 in this example). Then, screen 220 reports that the sensor or device (or unknown device) is identified and screen 221 removes the "<gathering info . . . >" message 214 from the status bar 208. At this point, the profile information from the sensor or device has been communicated to the base station 4 and, in turn, to the fob 24. Finally, the screen 222 prompts the user through the "<dial to highlight . . . >" message 210 and the "<press to select>" message (not shown) to select one of the three displayed actions: "Customize device?", "Done/Exit Training?" And "Remove device?". For example, "Customize device?" permits the user to name the sensor or device as is discussed in detail in connection with FIG. 9B of incorporated by reference U.S. Patent Application Publication No. 2005/0085248.

Alternatively, after screen 206 of FIG. 4, if the non-native network device 18 attempts network discovery (e.g., through user input 100 and the attempt_nwk_discovery( ) RF message 104 of FIG. 2A) at 224, then responsive to the receipt of the RF message 106 of FIG. 2A, the fob 24 responsively displays the screen 226 (e.g., without limitation, "unknown device identified, mate key w/adapter to join"; "Unknown sensor found. Ok to join?") on its display 126. This prompts the user to engage the fob 24 with or place the fob 24 proximate the adapter 22 of FIG. 1, at 228.

With respect to FIG. 3A, after a suitable timeout (e.g., without limitation, 5 seconds) at 114 (230 of FIG. 4), which follows no receipt of a data (alert) message 120 from the base station 4, the fob 24 displays the screen 232 (e.g., without limitation, "initiate join at device"; "prepare to join the sensor or device, please wait") on its display 126. Next, at 234 of FIG. 4, the user input 118 (FIG. 3A) causes the non-native network device 18 to attempt network discovery through the attempt_nwk_discovery( ) RF message 134 of FIG. 3A. Subsequently, the fob 24 receives the RF message 120 (FIG. 3A) from the base station 4 and responsively displays the screen 214 (e.g., without limitation, "gathering info"). The fob 24 then requests, at 239 (FIG. 2B or 3B), the profile 238 from the base station 4. After the profile 238 is transferred/received, the fob 24 displays in succession the screens 216, 220, 221 and 222.

EXAMPLE 10

In the examples of FIGS. 5-7, three different adapters 22', 22",22''' are shown, which may be similar to the adapter 22 of FIG. 1. All of the adapters 22',22",22''' include a suitable target, such as the example magnet (M) 36' (not shown in FIG. 7). Thus, the adapters 22,22',22",22''', the native network devices 8,10,12 and the base station 4 of FIG. 1 all include suitable targets, such as 36 or 36'. However, the non-native network device 18 does not include such a target. Although the absence of the targets 36,36' is one example of the difference between the native network devices 8,10,12 and the non-native network device 18, another more general example is the inability of the example fob 24 to sense (e.g., without limitation, through its second port 30) the non-native network device 18. For example, in FIG. 5, the second port 30 (FIG. 1) of the fob 24 includes a reed switch 250, which closes when it is proximate to the magnet 36' of one of the adapters 22',22",22'''.

EXAMPLE 11

The adapter 22' of FIG. 5 is a dummy structure including the magnet 36', which triggers the fob 24 to train the non-native network device 18 (FIG. 1). In this example, the housing 252 of the adapter 22' is preferably structured to mimic one of the native network devices, such as the sensor 10 (FIG. 1). The adapter 22' includes a suitable rail structure 254 structured to hold the fob 24.

EXAMPLE 12

The example adapter 22''' of FIG. 7 includes a depression 256 on a molded surface 258 (e.g., plastic) of a housing 260.

For example, the depression 256 may be impressed on the molded plastic surface 258, in order to indicate the proper position for the fob 24.

EXAMPLE 13

The example adapter 22" of FIG. 6 includes a temporary or removable label 262 disposed on a surface 264 of a housing 266, in order to indicate the proper position for the fob 24.

EXAMPLE 14

The label 38 of the adapter 22 of FIG. 1 may be a depression on a surface of the housing 34, in order to indicate the proper position for the fob 24.

EXAMPLE 15

The label 38 of the adapter 22 of FIG. 1 may be an imprinted text or design on a surface of the housing 34 proximate the target 36, in order to properly position the second port of the fob 24 with respect to the target 36 to start the joining procedure.

EXAMPLE 16

The label 262 of the adapter 22" of FIG. 6 is a removable label including an outline of the fob 24. The outline is structured to guide placement of the fob 24 on the surface 264 of the housing 266 proximate the magnet 36'.

EXAMPLE 17

The housing 266 of the adapter 22" has the magnet 36' embedded within the housing 266. The housing surface 264 has the label 262 disposed thereon proximate the magnet 36'. The second port of the fob 24 includes the reed switch 250 (shown in FIG. 5), which closes when that second port is proximate the magnet 36'.

EXAMPLE 18

As shown in FIG. 8, an adapter 22"", which is the same as or similar to the adapter 22 of FIG. 1, may be attached or coupled to the non-native network device 18 by any suitable coupling device, such as, for example and without limitation, the example fastener 268.

EXAMPLE 19

As another non-limiting example, the adapter 22"" includes a magnet (not shown) embedded in a relatively small piece of foam (not shown). The foam has the example fastener 268, such as, for example and without limitation, an adhesive back that attaches permanently to the non-native network device 18 and a paper label front (not shown) for proper alignment of the fob 24. In this example, there is one adapter 22"" per non-native network device 18. Here, a single adapter, which might be prone to being "lost," is not employed.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A wireless communication network comprising:
   a server including a wireless port;
   a number of native network devices, each of said native network devices comprising a first wireless port structured to wirelessly communicate with the wireless port of said server and a second port;
   a non-native network device comprising a wireless port structured to wirelessly communicate with the wireless port of said server;
   an adapter; and
   a fob comprising:
      a portable housing,
      a first wireless port structured to wirelessly communicate with the wireless port of said server,
      a second port structured to communicate with the second port of one of said native network devices when the second port of said fob engages or is proximate to said second port of one of said native network devices, and
      a processor operatively associated with the first wireless port and the second port of said fob, said processor being structured to receive engagement or proximity information from the second port of said fob, and to send information to the wireless port of said server from the first wireless port of said fob, said sent information pertaining to one of said native network devices or said non-native network device,
   wherein said adapter is structured to engage or be proximate to the second port of said fob when connecting said non-native network device to said wireless communication network,
   wherein the second port of said fob is structured to sense said adapter when the second port of said fob engages or is proximate to said adapter, and
   wherein the second port of said fob is not structured to sense said non-native network device.

2. The wireless communication network of claim 1 wherein said non-native network device is structured to initiate a joining procedure with said wireless communication network before said adapter engages or is proximate to the second port of said fob.

3. The wireless communication network of claim 1 wherein said non-native network device is structured to initiate a joining procedure with said wireless communication network after said adapter engages or is proximate to the second port of said fob.

4. The wireless communication network of claim 1 wherein the second port of said fob is structured to temporarily or momentarily mate with said second port of one of said native network devices.

5. The wireless communication network of claim 4 wherein said second port of one of said native network devices includes a magnet; and wherein the second port of said fob includes a reed switch, which closes when the second port of said fob is proximate said magnet.

6. The wireless communication network of claim 4 wherein said adapter includes a housing having a magnet embedded within the housing of said adapter and a surface having a label disposed thereon proximate said magnet; and wherein the second port of said fob includes a reed switch, which closes when the second port of said fob is proximate said magnet.

7. The wireless communication network of claim 6 wherein said label is a removable label including an outline of said fob to guide placement of said fob on the surface of the housing of said adapter proximate said magnet.

8. A sub-system for a wireless communication network including a server, a number of native network devices, and a number of non-native network devices, said sub-system comprising:
- a fob comprising:
  - a portable housing,
  - a first wireless port structured to wirelessly communicate with said server,
  - a second port structured to communicate with one of said native network devices when the second port of said fob engages or is proximate to said one of said native network devices, and
  - a processor operatively associated with the first wireless port and the second port of said fob, said processor being structured to receive engagement or proximity information from the second port of said fob, and to send information to said server from the first wireless port of said fob, said sent information pertaining to one of said native network devices or said non-native network device; and
- an adapter comprising a housing including a target,
- wherein when the second port of said fob is properly positioned with respect to said target, said fob responsively participates in a joining procedure of one of said non-native network devices to said server.

9. The sub-system of claim 8 wherein a label is disposed on the housing of said adapter proximate said target, in order that the second port of said fob may be properly positioned with respect to said target.

10. The sub-system of claim 9 wherein the housing of said adapter further includes a surface; and wherein said label is a temporary or removable label disposed on the surface of the housing of said adapter.

11. The sub-system of claim 9 wherein the housing of said adapter further includes a surface; and wherein said label is a depression on the surface of the housing of said adapter.

12. The sub-system of claim 9 wherein the housing of said adapter further includes a molded surface; and wherein said label is a impression in the molded surface of the housing of said adapter.

13. The sub-system of claim 9 wherein the housing of said adapter further includes a surface; and wherein said label is an imprinted text or design on the surface of the housing of said adapter, in order to properly position said fob in order to start said joining procedure.

14. The sub-system of claim 9 wherein the housing of said adapter further includes a surface; and wherein said label is a removable label including an outline of said fob, said outline being structured to guide placement of said fob on the surface of the housing of said adapter proximate said target.

15. The sub-system of claim 8 wherein the housing of said adapter is structured to mimic one of said native network devices.

16. The sub-system of claim 8 wherein the housing of said adapter includes a rail structured to hold said fob.

17. The sub-system of claim 8 wherein said non-native network device is a third party sensor or a third party device.

18. The sub-system of claim 8 wherein said processor includes a display; wherein said non-native network device is structured to receive user input and responsively send a first wireless message including an identifier of said non-native network device from said non-native network device to said server; wherein said server is structured to receive said first wireless message and responsively send a second wireless message from said server to said fob; and wherein said fob is structured to receive said second wireless message and responsive display a message on said display to prompt a user to engage said fob with or place said fob proximate said adapter.

19. The sub-system of claim 18 wherein the second port of said fob includes a proximity sensor structured to sense the target of said adapter, said fob responsively sending a third wireless message from said fob to said server; and wherein said server is structured to receive the third wireless message and responsively send a fourth wireless message to said non-native network device, in order to confirm connection to a wireless communication network including said server and said fob.

20. The sub-system of claim 19 wherein said processor includes a user input device; and wherein said fob is further structured to select the name of said non-native network device from said user input device responsive to receiving said second wireless message.

21. The sub-system of claim 8 wherein said processor includes a display; wherein said fob is structured to sense engagement of or proximity to said adapter by said fob and responsively send a first wireless message from said fob to said server to initiate a joining procedure for said non-native network device, and to time out and display a message at said display to prompt a user to undertake user input at said non-native network device; wherein said non-native network device is structured to receive said user input at said non-native network device and responsively send a second wireless message to said server; and wherein said server is structured to receive said first and second wireless messages at said server and responsively send a third wireless message to said non-native network device, and to send a fourth wireless message from said server to said fob.

22. The sub-system of claim 21 wherein said fob is structured to display said fourth wireless message at said display.

23. The sub-system of claim 21 wherein said processor includes a user input device; and wherein said fob is further structured to receive user input from said user input device and responsively name said non-native network device.

24. The sub-system of claim 8 wherein said processor includes a display; and wherein said fob is further structured to display a message on said display and await receipt of a wireless message from said server.

25. The sub-system of claim 8 wherein said target is a magnet embedded in or substantially within the housing of said adapter; and wherein the second port of said fob includes a proximity sensor responsive to said magnet.

26. The sub-system of claim 8 wherein said adapter is structured to be independent from said one of said non-native network devices.

27. The sub-system of claim 8 wherein said adapter is structured to be coupled to said one of said non-native network devices.

28. A method of configuring a non-native network device of a wireless communication network including a server, said method comprising:
- employing a fob;
- engaging said fob with or placing said fob proximate an adapter;
- responsive to said engaging said fob with or placing said fob proximate an adapter, communicating a wireless message from said fob to said server in order to configure said non-native network device;
- communicating a wireless message from said non-native network device to said server in order to configure said non-native network device; and
- receiving a confirmation from said server and responsively displaying said confirmation at said fob that said non-native network device was configured as part of said wireless communication network.

29. The method of claim 28 further comprising receiving user input at said non-native network device;

sending a first wireless message including an identifier of said non-native network device from said non-native network device to said server;

receiving said first wireless message and responsively sending a second wireless message from said server to said fob;

after receiving said second wireless message at said fob, engaging said fob with or placing said fob proximate said adapter, sensing said adapter and responsively sending a third wireless message from said fob to said server;

receiving the second and third wireless messages at said server and responsively sending a fourth wireless message to said non-native network device, in order to confirm connection of said non-native network device to said wireless communication network.

30. The method of claim 29 further comprising employing said fob to select the name of said non-native network device.

31. The method of claim 29 further comprising displaying said second wireless message at said fob.

32. The method of claim 28 further comprising sensing engagement of said adapter by or proximity of said adapter to said fob and responsively sending a first wireless message from said fob to said server to initiate joining said non-native network device to said wireless communication network;

timing a predetermined time at said fob before displaying a message at said fob to prompt a user to undertake user input at said non-native network device;

receiving said user input at said non-native network device and responsively sending a second wireless message to said server;

receiving said first and second wireless messages at said server and responsively sending a third wireless message to said non-native network device to confirm joining said non-native network device to said wireless communication network;

sending a fourth wireless message from said server to said fob; and displaying said fourth wireless message at said fob.

33. The method of claim 32 further comprising displaying a message at said fob before said timing a predetermined time at said fob, and awaiting receipt of a wireless message from said server.

34. The method of claim 32 further comprising receiving user input at said fob and responsively naming said non-native network device.

35. The method of claim 28 further comprising employing said adapter independent from said non-native network device.

36. The method of claim 28 further comprising coupling said adapter to said non-native network device.

\* \* \* \* \*